United States Patent [19]
Kimmo

[11] Patent Number: 5,063,561
[45] Date of Patent: Nov. 5, 1991

[54] PROCEDURE AND APPARATUS FOR TRANSMITTING BINARY MESSAGES IN A SERIAL COMMUNICATION BUS

[75] Inventor: Selin Kimmo, Hyvinkaa, Finland

[73] Assignee: Kone Elevator GmbH, Switzerland

[21] Appl. No.: 413,523

[22] Filed: Sep. 27, 1989

[30] Foreign Application Priority Data

Sep. 30, 1988 [FI] Finland ................. 884500

[51] Int. Cl.⁵ .................................... H04L 12/28
[52] U.S. Cl. ..................... 370/85.2; 370/85.6
[58] Field of Search ............ 370/85.2, 85.3, 85.6, 370/17; 375/36, 19, 121; 371/6, 57.1, 67.1; 361/77, 84

[56] References Cited

U.S. PATENT DOCUMENTS

| | | | |
|---|---|---|---|
| 3,863,025 | 1/1975 | Gonsewski et al. | 178/69 |
| 4,463,351 | 7/1984 | Chiarottino | 370/85.6 |
| 4,569,046 | 2/1986 | Hadziomerovic et al. | 1.37/85.6 |
| 4,715,031 | 12/1987 | Crawford et al. | 370/85.6 |
| 4,723,239 | 2/1988 | Schwartz | 370/85.6 |
| 4,739,323 | 4/1988 | Miesterfeld et al. | 370/85.2 |
| 4,768,189 | 8/1988 | Gopinath et al. | 370/85.3 |
| 4,860,311 | 8/1989 | Storberg | 375/19 |
| 4,910,628 | 3/1990 | Minagawa et al. | 361/84 |

FOREIGN PATENT DOCUMENTS

| | | |
|---|---|---|
| 250698 | 1/1988 | European Pat. Off. |
| 275464 | 7/1988 | European Pat. Off. |
| 1515772 | 6/1978 | United Kingdom |

Primary Examiner—Douglas W. Olms
Assistant Examiner—Melvin Marcelo
Attorney, Agent, or Firm—Nixon & Vanderhye

[57] ABSTRACT

A procedure and apparatus for transmitting binary messages in a serial communication bus, to which several transmitting stations are connected is disclosed. Each station is able to transmit a message when the bus is free, and is a signal collision situation when several stations attempt to transmit messages simultaneously, each station monitors the message which is passing through the bus and only the station which has the highest priority is allowed to go ahead and transmit its message while each station having a lower priority which, when transmitting a signal of a logic state assigned a recessive status, receives a signal of a logic state assigned a dominating status cancels its transmission attempt. All stations transmit a dominant signal with the same polarity by recognizing the polarity of the signal present in the bus and by sending the dominating signal with that polarity.

11 Claims, 7 Drawing Sheets

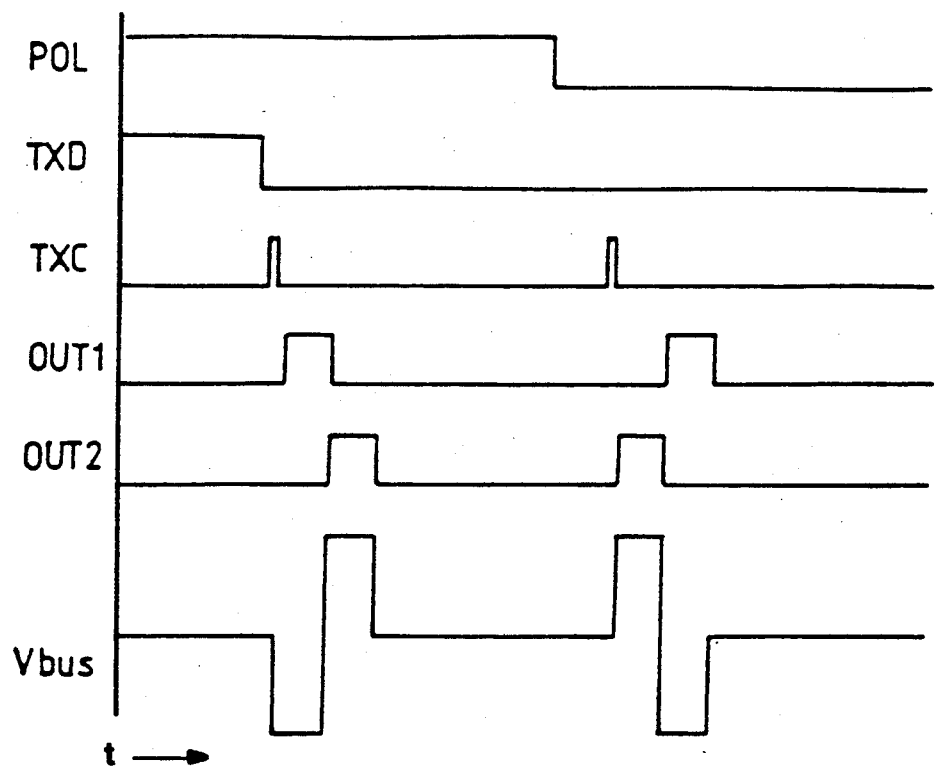
*Fig. 3*
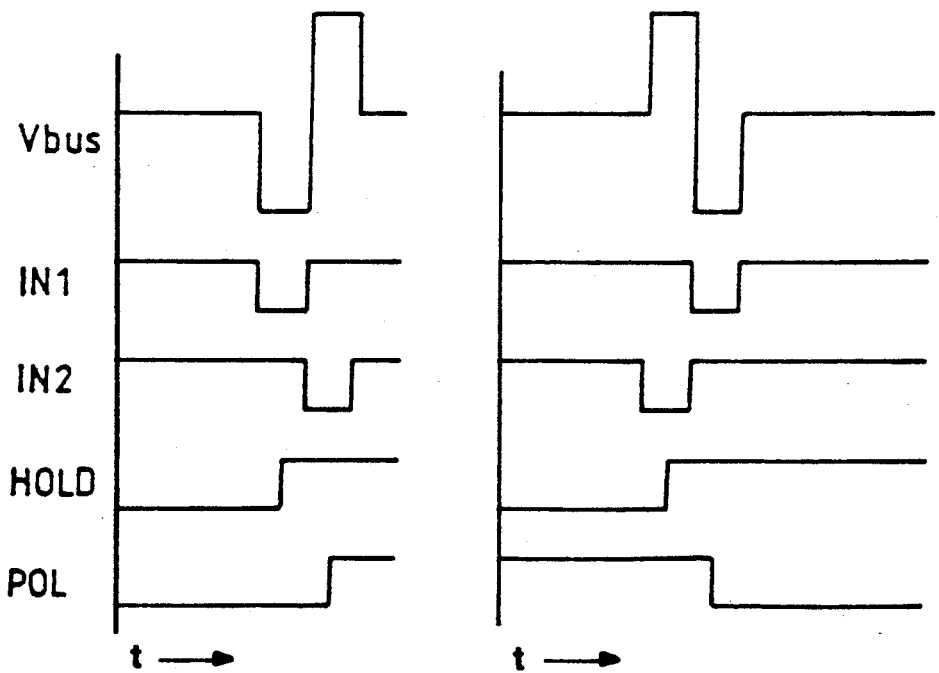
*Fig. 4a*  *Fig. 4b*

Fig. 8
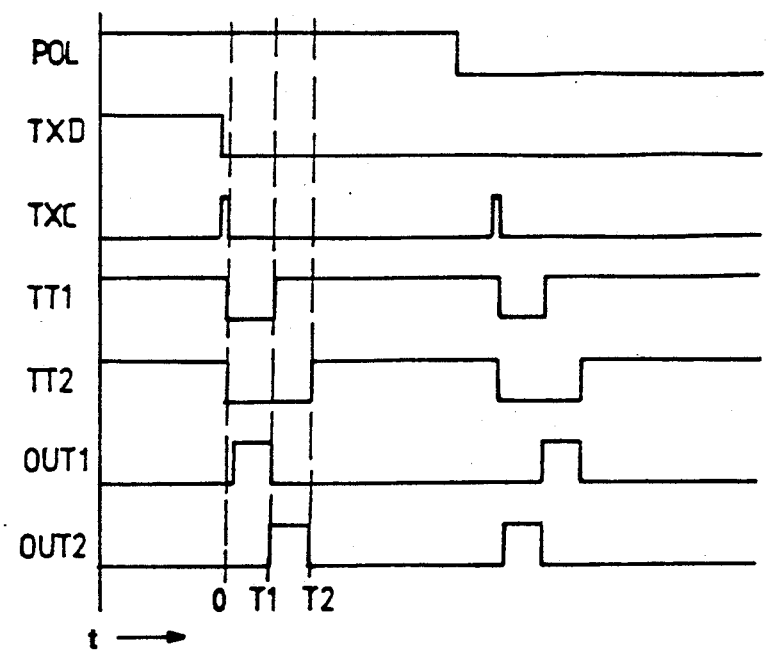
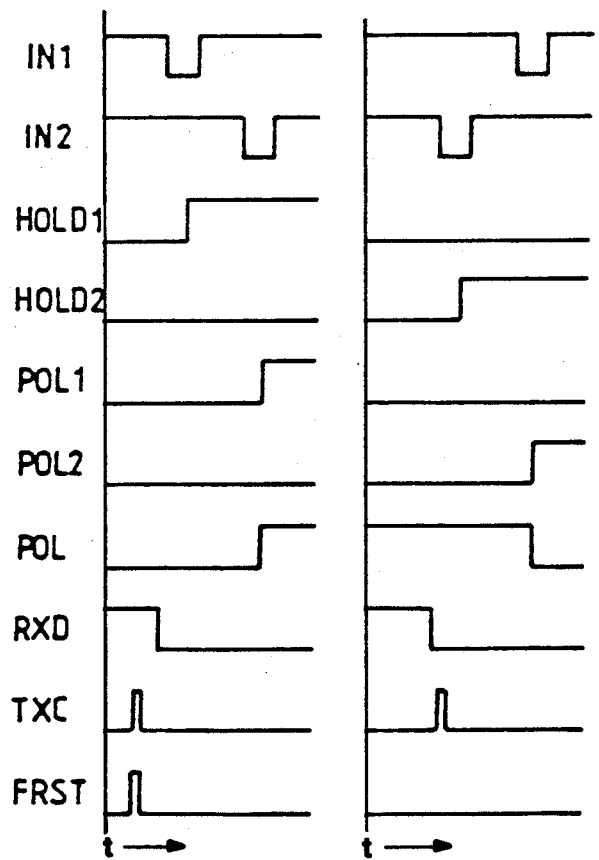
Fig. 9a  Fig. 9b

PROCEDURE AND APPARATUS FOR TRANSMITTING BINARY MESSAGES IN A SERIAL COMMUNICATION BUS

BACKGROUND OF THE INVENTION

1. Field Of The Invention

The present invention relates to a procedure and an apparatus for transmitting binary messages in a serial communication bus, several transmitting stations being connected to said bus. More specifically, the procedure is one in which each station is able to transmit a message when the bus is free, and in which, in a signal collision situation when several stations attempt to transmit messages simultaneously, each station monitors the message which is passing through the bus and only the station which has the highest priority is allowed to go ahead and transmit its message while each station having a lower priority which, when transmitting a signal of a logic state assigned a recessive status, receives a signal of a logic state assigned a dominating status cancels its transmission attempt.

2. Description Of Related Prior Art

The multimaster serial bus is based on the idea that each station is allowed to start a transmission any time when the bus is free. Therefore, collisions occur in the bus when two or more stations start transmission simultaneously. Using the bit arbitration method, a signal collision in a multimaster bus can be managed in such manner that the message of the highest priority is transmitted while the other stations wait until said high-priority message has been passed through. This is implemented by assigning one of the logic states a recessive status and the other a dominant status. The so-called AMI (Alternative Mark Inversion) code meets the requirement that a dominant bit has precedence over a recessive bit. In AMI coding, every second dominating bit is transmitted with a different polarity and a recessive bit is equivalent to a free bus. The first bit of each message is transmitted with a different polarity from that of the previous message. This means that it is necessary to know which way the bus connection leads are to be mounted to allow control of the collision.

SUMMARY OF THE INVENTION

The object of the present invention is to eliminate the aforesaid drawback. The procedure of the invention for transmitting binary messages in a serial communication bus is characterized in that all the stations transmit the dominant signal with the same polarity. The polarity of signals passing through the bus is continuously detected and a dominant signal having that polarity is transmitted by all stations regardless of the way the station terminals are connected to the bus.

The apparatus designed for applying the procedure of the invention for transmitting binary messages through a serial communication bus, several apparatus being connected to said bus for transmitting and receiving messages, each apparatus being able to transmit a message when the bus is free, each apparatus comprising a receiver which, monitors the message passing through the bus, and a transmitter which is so controlled that in a collision situation when several apparatuses attempt to transmit messages simultaneously only the apparatus which has the highest priority is able to go ahead and transmit its message while each apparatus of a lower priority which, when transmitting a signal of a logic state assigned a recessive status, receives a signal of a logic state assigned a dominating status cancels its transmission attempt, is characterized in that the apparatus incorporates a polarity testing unit which recognizes the polarity of the signal present in the bus and causes the transmitter to transmit a dominant signal having the polarity of the signal present in the bus.

The insensibility to signal polarity, which means that a pair of conductors may be connected both ways at different points of connection, is an important feature especially in the case of a serial bus implemented using a twisted pair of conductors. Connecting a station to the bus becomes easier because one need not consider which conductor is to be coupled to a respective connection. Besides, since individual conductors need not be recognized, the invention makes it possible to use a larger variety of conductors. If the signals are transmitted through a pulse transformer, the power consumption of the transformer is reduced since the signal transmitted consists of a pulse pair considerably shorter in duration than the signal. Moreover, the invention allows the transmission speed to be varied without altering the configuration of the apparatus.

BRIEF DESCRIPTION OF THE DRAWINGS

Further objects, features and advantages will become apparent to those skilled in the art from the following description thereof when taken in conjunction with the accompanying drawings, in which:

FIG. 3 is a timing diagram illustrating the output (transmission) signals;

FIG. 4a illustrates timing diagrams of the input (received) signals for a polarity detected on the bus;

FIG. 4b illustrates timing diagrams of the input (received) signals for the opposite polarity detected on the bus;

FIG. 8 shows the timing diagrams for the transmission logic;

FIG. 9a shows the receiver logic timing diagrams for a polarity detected on the bus; and FIG. 9b shows the receiver logic timing diagrams for the opposite polarity detected on the bus.

DESCRIPTION OF THE PREFERRED EMBODIMENTS

Figure 1:
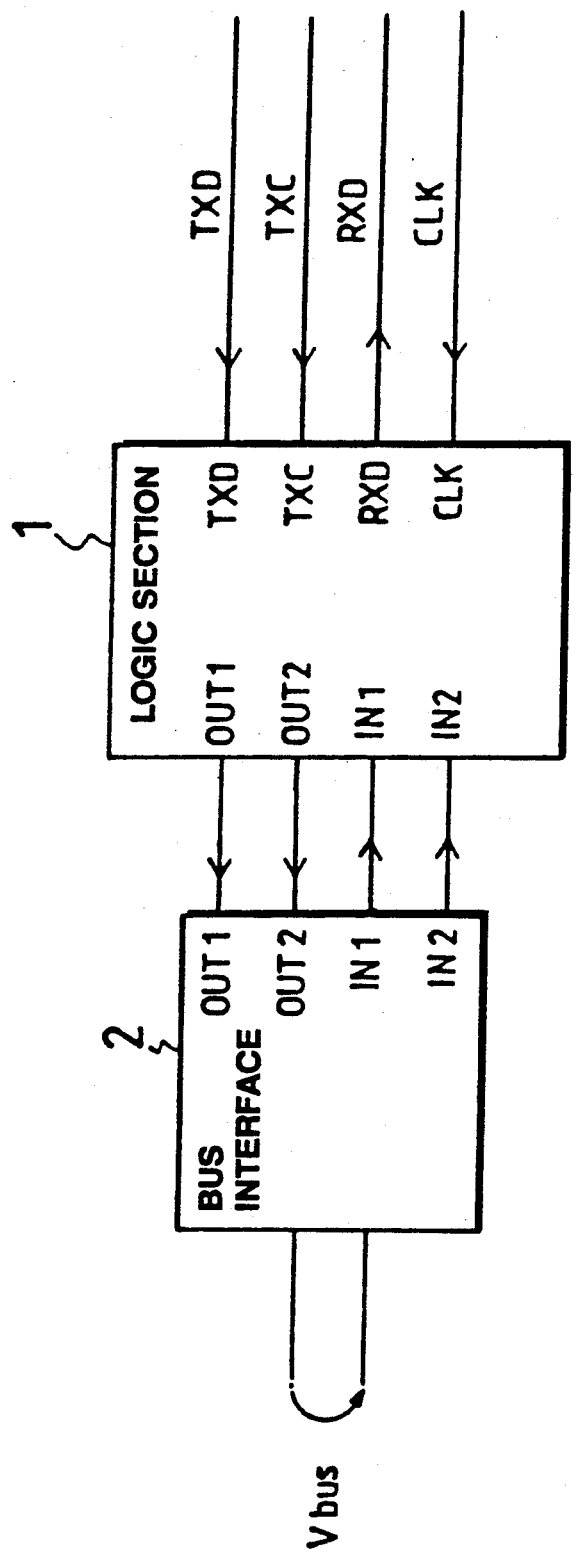
FIG. 1 is a block diagram of an embodiment of the apparatus of the present invention.

The modulator, shown as a block diagram in FIG. 1, implements polarity-sensitive bit coding in a multimaster serial bus accessed via a pulse transformer on the basis of bit arbitration. Such a bus can be used as a serial communication bus e.g. in the control system of an elevator.

The modulator constitutes the logic between the controller and the pulse transformer. The modulator consists of two sections: a logic section 1, which contains the coding logic, and a bus interface 2, which contains a control stage and a receiver comparator.

In the description below, the zero bit has been selected as the dominant bit. In the event of signal collision, each station monitors the bus and, if the station receives a dominant bit when sending a recessive bit, it cancels its transmission attempt.

In this bus accessing procedure, all stations send a dominant signal with the same polarity into the bus. Moreover, the coding is so implemented that a dominant bit being transmitted has precedence over a recessive bit.

The data to be transmitted is so encoded that only the dominant bits will be transmitted. Each dominant bit is sent in the same way in such manner that the polarity determines the pulse shape. The polarity is monitored during each bit, so that the polarity can be changed very swiftly. Once the first bit of a message has entered the bus, each station immediately changes to the correct polarity. The basic idea is to turn the transmitter to the correct polarity as soon as the receiver has recognized the polarity of the signal on the bus. The bus is monitored continuously, which means that the change to the correct polarity is effected fully dynamically.

Figure 2:
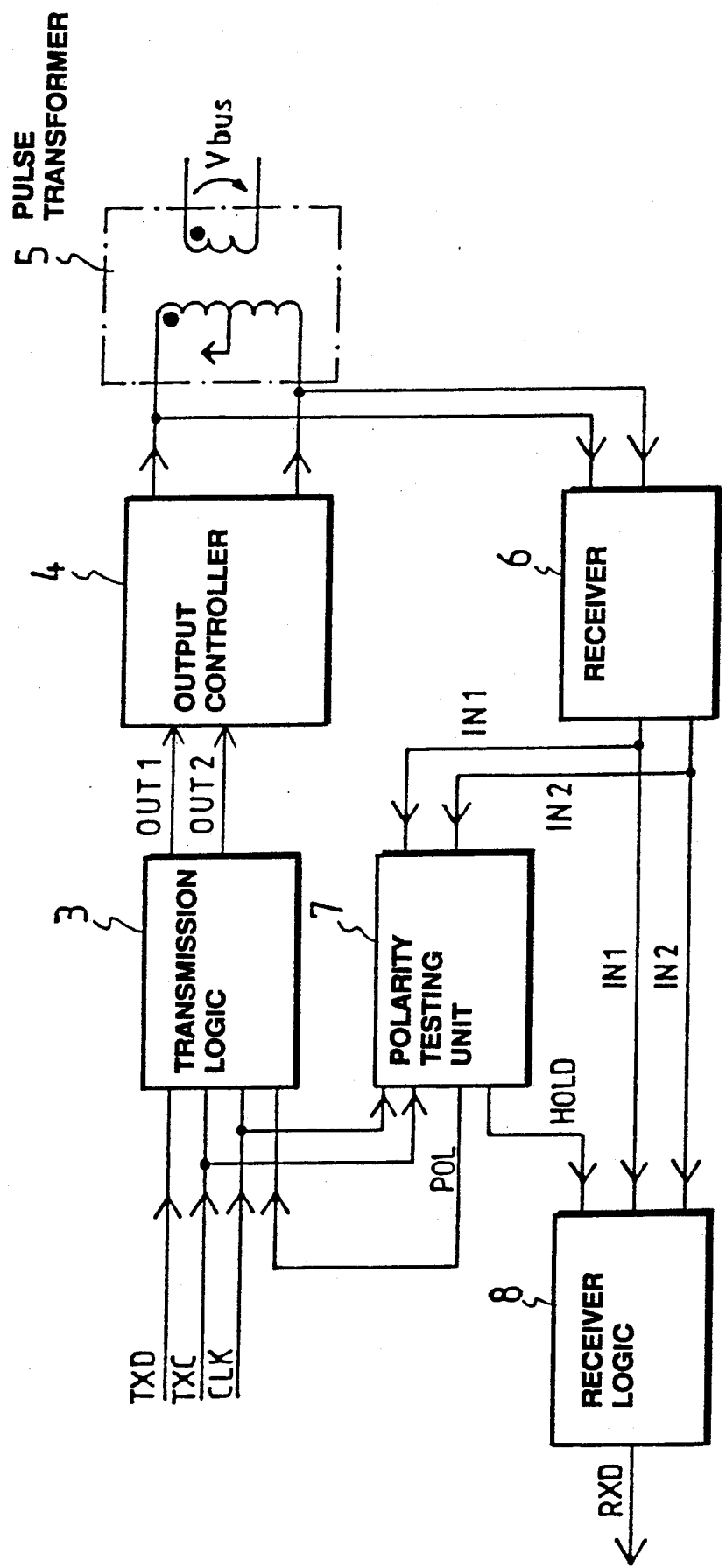
FIG. 2 is a detailed block diagram, representing the operation of the apparatus of FIG. 1.

The apparatus illustrated in FIG. 2 comprises a transmission logic 3, an output controller 4, a pulse transformer 5, a receiver 6, a polarity testing unit 7 and a receiver logic 8. The inputs to the transmission logic 3 are the transmission data TXD, the baud clock signal TXC and the clock pulse CLK, supplied by the controller. The baud clock signal and the clock pulses are also input to the polarity testing unit 7. The transmission logic 3 provides the output signal OUT1 of channel 1 and the output signal OUT2 of channel 2, both of which are fed into the output controller 4, which transmits the message through the pulse transformer 5. The bus interface consists of the output controller 4, the pulse transformer 5 and the receiver 6. The receiver 6 monitors the line via the pulse transformer, and the message received, consisting of signals IN1 and IN2, proceeds from the receiver to the polarity testing unit 7 and to the receiver logic 8, which outputs the signal RXD. The polarity testing unit provides a polarity signal POL, which is input to the transmission logic 3, and a HOLD signal, which is input to the receiver logic 8.

Figure 5:
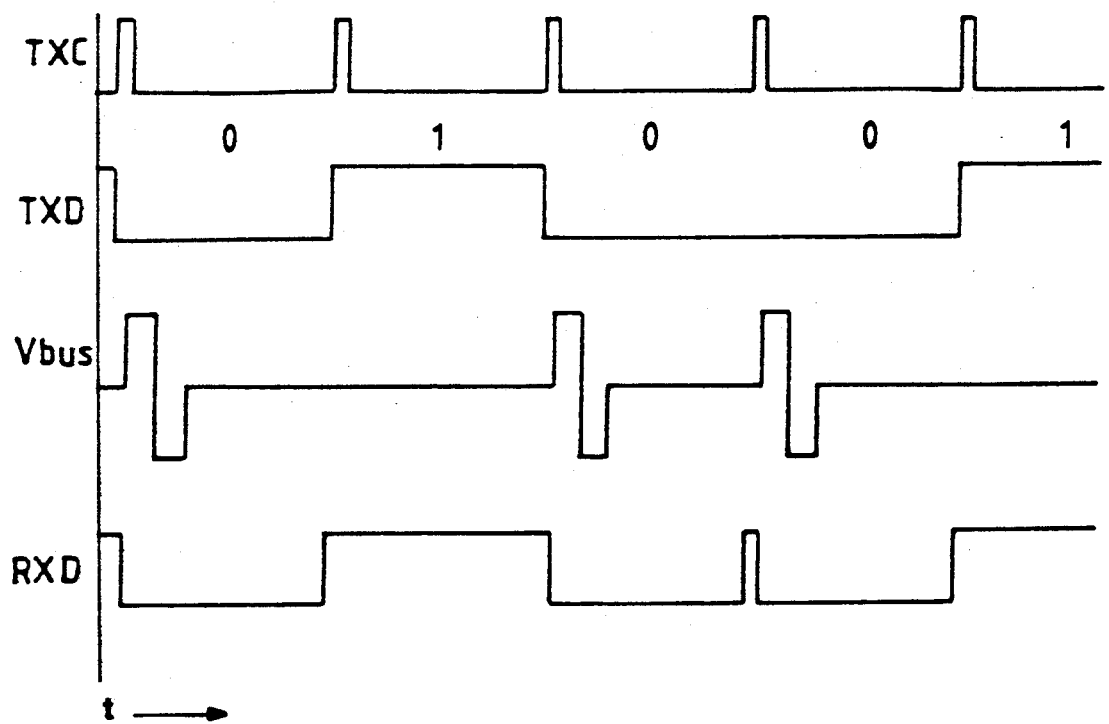
FIG. 5 shows the timing diagrams of the coding principle of the present invention.

FIG. 3 shows the generation of transmission signals OUT1 and OUT2 for the two detected polarities POL. FIGS. 4a and 4b show the decoding of the received signals IN1 and IN2 for these two polarities. FIG. 5 illustrates the coding principle, showing also the reception signal RXD which is input to the controller.

Figure 6:
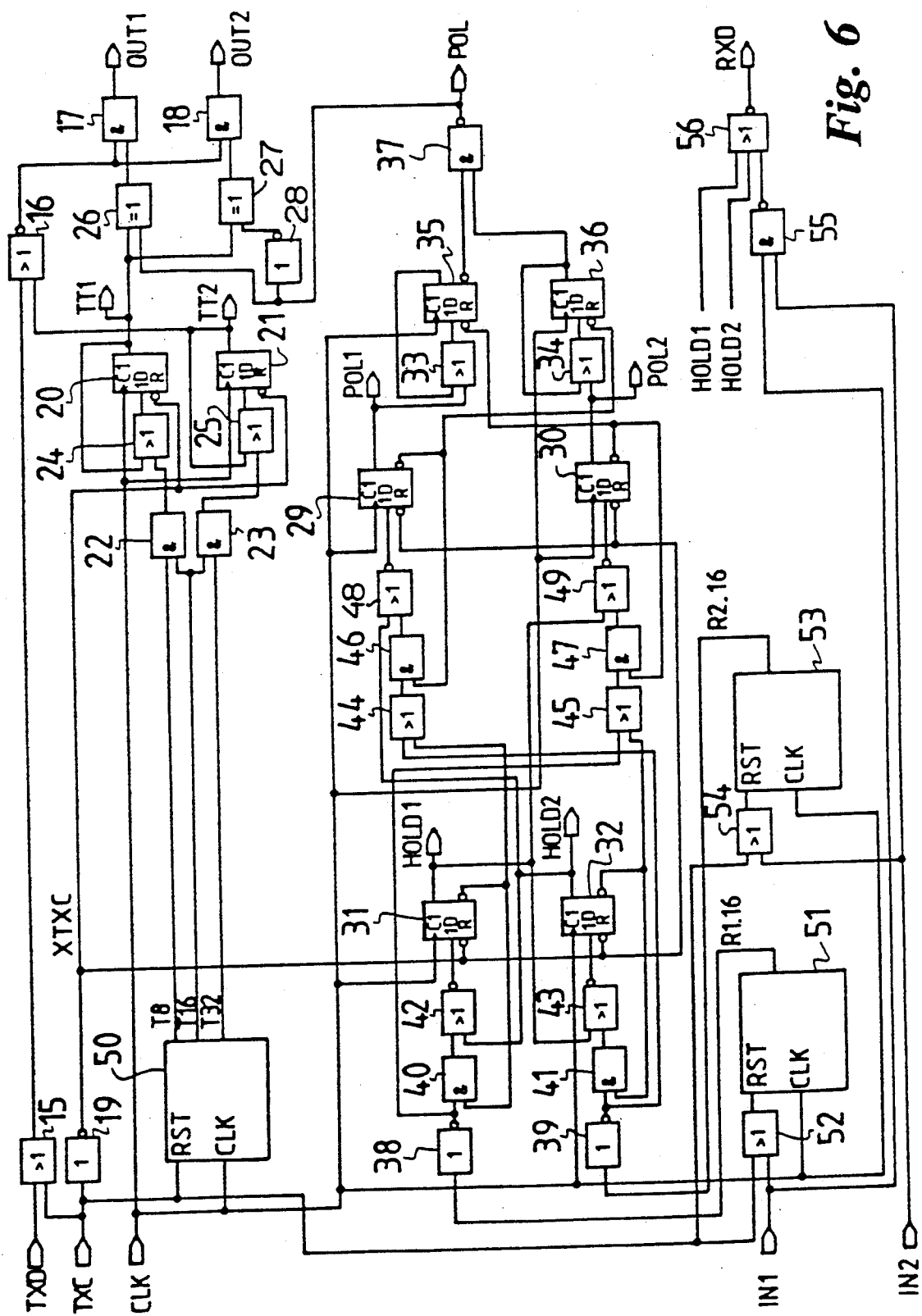
FIG. 6 shows the circuit diagram of the logic section.

The circuit diagram of the transmission logic block is shown in FIG. 6 and will be described with reference to the diagrams of FIG. 8.

FIG. 8 shows the transmission logic timing diagrams. There are two internal timing signals TT1 and TT2, of which the first one, TT1, is low during the first output pulse OUT1 when POL is 1 and the second one, TT2, is low during the first and the second output pulses OUT1 and OUT2 when POL is 1. The polarity signal POL determines which channel is transmitted first.

The TXD signal is passed via two OR gates 15 and 16 to AND gates 17 and 18, from which the output signals OUT1 and OUT2 of the two channels are obtained. The other input of the first OR gate 15 receives the TXC signal, while the other input of the second OR gate 16 receives the second internal timing signal TT2. The AND gates 17 and 18 also receive timing signals, which are obtained by first inverting the TXC signal in a NOT circuit 19 to produce the XTXC signal, which is then applied to the R-inputs of two D-flip-flops 20 and 21. These flip-flops are also fed by the clock signal CLK and by signals obtained from the T8, T16 and T32 signals by passing these through AND gates 22 and 23 and then, together with the flip-flop feedback signals, through OR gates 24 and 25 and then into the flip-flops. These provide the internal timing signals TT1 and TT2. In each channel, the first timing pulse signal TT1 is fed into unconditional OR gates 26 and 27, which are also fed by the polarity signal POL obtained from the receiver, the POL signal for channel 2 being inverted by circuit 28. From these OR gates 27 and 28, the timing signals are passed into the aforesaid AND gates 17 and 18. Signals T8, T16 and T32 are provided by a counter 50 that counts 8, 16 and 32 clock pulses CLK.

In accordance with the above description, the transmission signal is so encoded that logic "ones" are not transmitted at all while logic "zeros" are transmitted as signal pair OUT1, OUT2. If the polarity POL signal is one, the first signal OUT1 is transmitted first, and vice versa. The TXC signal is transmitted at the beginning of each bit. It resets the counter 50, which then starts counting up again from zero. If the TXD signal is zero, the TT1 and TT2 signals are used to generate the output signals OUT1 and OUT2, which together are considerably shorter in duration than the complete signal.

The operation of the logic is exemplified by the following truth table, in which the first line represents the starting situation and $<<X>>$ stands for a state in which the logic state of the signal is irrelevant. TXD, TXC, POL, TT1 and TT2 are the input signals, OUT1 and OUT2 being the output signals.

| TXD | TXC | POL | TT1 | TT2 | OUT1 | OUT2 | TIME |
|-----|-----|-----|-----|-----|------|------|------|
| X   | 1   | X   | 0   | 0   | 0    | 0    | TIME |
| 1   | 0   | x   | 0   | 0   | 0    | 0    | 0-T1 |
| 1   | 0   | x   | 1   | 0   | 0    | 0    | T1-T2 |
| 1   | 0   | x   | 1   | 1   | 0    | 0    | T2-  |
| 0   | 0   | 1   | 0   | 0   | 1    | 0    | 0-T1 |
| 0   | 0   | 1   | 1   | 0   | 0    | 1    | R1-T2 |
| 0   | 0   | 1   | 1   | 1   | 0    | 0    | T2-  |
| 0   | 0   | 0   | 0   | 0   | 0    | 1    | 0-T1 |
| 0   | 0   | 0   | 1   | 0   | 1    | 0    | T1-T2 |
| 0   | 0   | 0   | 1   | 1   | 0    | 0    | T2-  |

FIG. 6 shows the circuit diagram of the receiver logic and the polarity testing logic which will be described with reference to the timing diagrams of FIGS. 9a and 9b.

FIGS. 9a and 9b show the timing diagrams for the receiver logic in two different cases. The first reception signal IN1 is obtained from channel 1 of the comparator, which is described below, and the second reception signal IN2 from channel 2. Signal RXD is the receiver signal for the controller, HOLD1 is the receiver hold signal for channel 1, HOLD2 the receiver hold signal for channel 2, POL1 is the polarity signal for channel 1 and POL2 for channel 2.

The logic circuitry comprises four D-flip-flops 29-32, each of which receives the XTXC signal in port R. The outputs of the first and the second receiver flip-flops 29 and 30 provide the polarity change signals POL1 and POL2 for the two channels. These signals are passed via OR gates 33 and 34 to flip-flops 35 and 36, from whose outputs feedback signals are returned into said OR gates 33 and 34. The inverted output of the flip-flop 35 of the first channel and the output of the flip-flop 36 of the second channel are applied to the inputs of AND gate 37, whose output is the polarity signal POL.

In each channel, the first and the second flip-flops receive signals generated from the timing signals R1.16 and R2.16 as follows. The timing signals are inverted by circuits 38 and 39, from where they are passed through AND gates 40 and 41 and then through OR gates 42 and 43 to the flip-flop 31 and 32, whose R-inputs are fed by the TXTC signal. The other inputs of AND gates 40 and 41 are fed by the inverted outputs of flip-flops 31 and 32, and the other inputs of OR gates 43 and 42, respectively are fed by the non-inverted outputs of flip-flops 31 and 32, i.e. by the hold signals HOLD1 and HOLD2. The inverted output of flip-flop 31 of the first channel and the inverted timing signal of the second channel are input to OR gate 44, whose output and the inverted output of the first flip-flop 29 are applied as inputs to AND gate 46. The output of AND gate 46 and the hold signal HOLD2 of the second channel are fed into OR gate 48. The output of this gate is input to flip-flop 29. The corresponding input signal for the second flip-flop 30 is obtained in a similar manner through OR gates 45 and 49 and AND gate 47. The timing signals R1.16 and R2.16 are produced by counters 51 and 53 by counting 16 clock pulses CLK when the IN1 signal is low. The first counter 51 obtains its RST signal from OR gate 52, whose inputs are fed by the input signal IN1 and the baud clock signal TXC. Similarly, the second counter 53 obtains its RST signal from OR gate 54, whose inputs are the second input signal IN2 and the baud clock signal.

As shown by FIG. 6, the reception signal RXD is produced by an OR circuit 56 whose inputs are fed by the hold signals HOLD1 and HOLD2 and a signal obtained from an AND gate 55 fed by the input signals IN1 and IN2.

The receiver logic is activated when one of the input signals IN1 and IN2 goes low. If the first reception signal IN1 goes low first, the reception counter 51 of channel 1 starts counting. For a certain time, which is shorter than the pulse duration T1 shown in FIG. 8, the incoming bit is defined as a logic "zero", which causes the HOLD1 signal to go high. This signal remains in the high state throughout the duration of the bit until the next TXC pulse occurs. For the polarity testing operation, also the second input signal IN2 is required. In order for the polarity signal POL to change to the 1-state, after the first input signal IN1 has been low for the time indicated above, the second input signal IN2 also has to remain low for an equal time during the same bit. This causes the polarity signal POL1 to go high, resulting in the polarity signal POL changing to the 1-state. If the second input signal IN2 goes low first, the same sequence is required for the POL signal to change to zero, but the signals involved are the hold and polarity signals of channel 2, i.e. HOLD2 and POL2.

Figure 7:
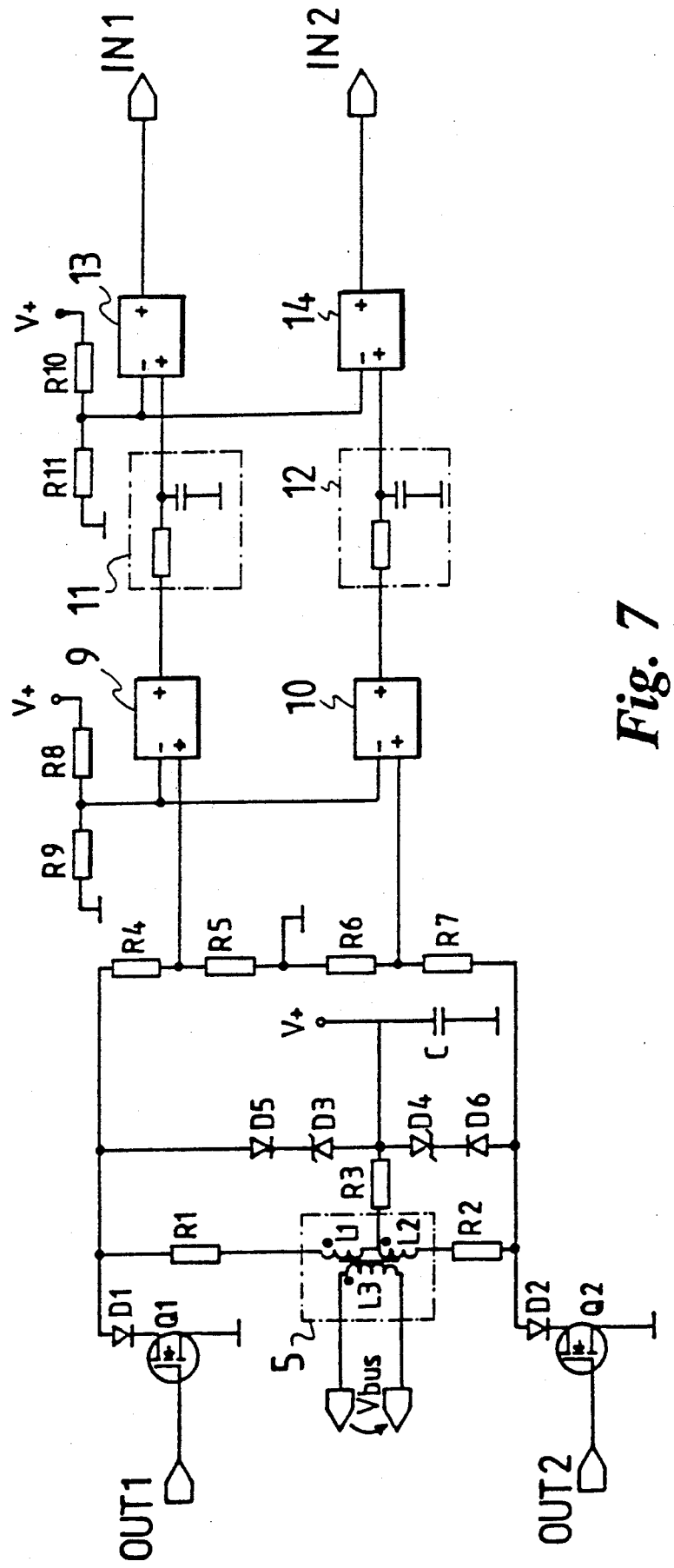
FIG. 7 shows the circuit diagram of the bus interface.

FIG. 7 is a diagram of the bus interface circuit, comprising an output controller and a receiver. In each channel, the output controller is implemented using a MOS-FET Q1,Q2. Connected in series with the drain of each transistor is a diode D1,D2 to ensure that the transistor will not constitute a load on the line when power is off. The pulse transformer 5 is connected to the terminals of these diodes via resistors R1 and R2. In series with each winding L1 and L2 is a series circuit of a Zener diode D3,D4 and a diode D5,D6, which serve to reduce the interference generated by the transformer. The midpoint between these series circuits is connected to the positive voltage V+ and via capacitor C to ground, and via resistor R3 to the transformer midpoint between windings L1 and L2. The resistors protect the transformer against short circuits in the transistors. The bus signal VBUS is obtained from the transformer winding L3 connected to the line.

The receiver is implemented using comparators 9, 10, 13 and 14. The positive terminal of the first comparator 9 is connected to the midpoint of two resistors R4 and R5, where R4 is connected to the diode D1 protecting transistor Q1 and R5 to ground, and the comparator 10 is similarly connected to the second channel via resistors R6 and R7. The negative terminal of each of these two comparators is connected to a reference voltage, which is obtained from the V+ voltage from the midpoint of a series circuit consisting of resistors R8 and R9. From the first comparator 9, respectively 10, the signal proceeds in each channel through an RC filter 11 or 12 to the positive terminal of a second comparator 13 or 14, which compares the signal to a reference voltage obtained as above by means of resistors R10 and R11. These comparators 13 and 14 produce the input signals IN1 and IN2 for the two channels.

Considering the circuit action in channel 1 when a signal is being received from the line, when the transformer produces a negative signal—polarity being indicated by the dots at the windings—the signal proceeds through resistors R1 and R4 to the first comparator 9, where it is compared to the reference voltage. The comparator output then goes low. The signal then proceeds through the filter 11 into the second comparator 13, which again compares it to the reference voltage. This comparator outputs a negative pulse IN1 as shown in FIG. 9a. The other channel functions in a corresponding manner. By means of the comparators and filters, in addition to the counters described above, the receiver checks and corrects the amplitude and duration of the incoming pulses.

It will now be obvious to a person skilled in the art that embodiments of the invention are not restricted to the examples disclosed above, but may instead be varied within the scope of the following claims.

I claim:

1. A procedure for transmitting binary signals on a serial communication bus, several transmitting stations being connected to said bus and each station monitoring signals present on the bus, wherein:
   when the bus is free, any station may transmit an output signal; and
   in a signal collision situation, when several transmitting stations attempt to transmit simultaneously an output signal, a station which has the highest priority is allowed to transmit, while any station having a lower priority, which when transmitting said output signal of a logic state assigned a recessive status receives an input signal of a logic state assigned a dominating status, will cancel its transmission attempt;
   wherein the polarity of said input signal is detected by each station connected to the bus and the same detected polarity is assumed by each station when transmitting said output signal.

2. A procedure as in claim 1, wherein each station connected to said bus continuously monitors the polarity of signals present on the bus as long as said station remains connected to said bus.

3. An apparatus for applying the procedure of claim 1, designed for transmitting binary signals on a serial communication bus, such that a plurality of said apparatuses are connectable to said bus for transmitting and receiving signals, each apparatus being able to transmit when said bus is free, said apparatus comprising:

a receiver by means of which each apparatus monitors the signal on said bus;

a transmitter which is so controlled that, in a signal collision situation, when several apparatuses attempt to transmit messages simultaneously, only the apparatus which has the highest priority is able to transmit while each apparatus of a lower priority which, when transmitting a signal of a logic state assigned a recessive status, receives a signal of a logic state assigned a dominating status, cancels its transmission attempt; and a polarity testing unit which detects the polarity of said signal present in said bus and causes the transmitter to transmit an output signal containing only dominating status bits having that polarity.

4. An apparatus as in claim 3, wherein said transmitter is controlled such that the duration of said dominating status bit is smaller than the period of said output signal.

5. An apparatus as in claim 3, wherein said receiver comprises a first comparator, a filter and a second comparator operatively connected on each channel and adapted to process said input signal to obtain a determined amplitude thereof and wherein said receiver logic comprises a counter operatively connected on each channel, adapted to further process said input signal to obtain a determined duration thereof.

6. An apparatus according to claim 3 in combination with serial communication bus in the control system of an elevator.

7. An apparatus as in claim 3, further comprising a pulse transformer for coupling to said bus and wherein said transmitter codes a signal to be transmitted such that said output signal will contain only dominating status bits consisting of two successive pulses having opposite polarities, whereby when said output signal is transmitted into said bus through said pulse transformer, equal positive and negative polarity voltages are obtained on the bus.

8. A procedure as in claim 1 further comprising coding the output signal to be transmitted such that said output signal will contain, for all transmitting stations, only dominating status bits identical in amplitude and duration and having a polarity in agreement with the polarity of the input signal detected on the bus.

9. A procedure as in claim 6, further comprising summing said two successive pulses having opposite polarities such that the duration of said dominating status bit is shorter than the duration of a period of said output signal.

10. A procedure as in claim 8, further comprising checking the amplitude and duration of said input signal to ensure that the amplitude and duration of received dominating status bit are within preset limits before said input signal is processed.

11. A procedure as in claim 8 wherein the said dominating status bits are formed from two successive pulses with opposite polarities such that, when said output signal is transmitted into said bus through a pulse transformer, equal positive and negative polarity voltages are obtained on the bus.

* * * * *

UNITED STATES PATENT AND TRADEMARK OFFICE
CERTIFICATE OF CORRECTION

PATENT NO. : 5,063,561
DATED : 5 November 1991
INVENTOR(S) : SELIN

It is certified that error appears in the above-identified patent and that said Letters Patent is hereby corrected as shown below:

Column 8, line 1, claim 9, change "6" to --11--.

Signed and Sealed this

Eleventh Day of May, 1993

Attest:

MICHAEL K. KIRK

*Attesting Officer*     *Acting Commissioner of Patents and Trademarks*